United States Patent
Naik et al.

(10) Patent No.: US 12,405,610 B1
(45) Date of Patent: Sep. 2, 2025

(54) MARINE PROPULSION SYSTEM AND METHOD FOR WAKE CONTROL

(71) Applicant: Brunswick Corporation, Mettawa, IL (US)

(72) Inventors: Aadish Dilip Naik, Champaign, IL (US); Brandon L. Tate, Walnut Hill, IL (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 137 days.

(21) Appl. No.: 17/903,938

(22) Filed: Sep. 6, 2022

(51) Int. Cl.
| | |
|---|---|
| G05D 1/00 | (2024.01) |
| B63B 79/10 | (2020.01) |
| B63B 79/40 | (2020.01) |
| B63H 20/12 | (2006.01) |

(52) U.S. Cl.
CPC ........... *G05D 1/0206* (2013.01); *B63B 79/10* (2020.01); *B63B 79/40* (2020.01); *B63H 20/12* (2013.01)

(58) Field of Classification Search
CPC ...... G05D 1/0206; B63B 79/10; B63B 79/40; B63H 20/12
See application file for complete search history.

(56) References Cited

U.S. PATENT DOCUMENTS

| | | |
|---|---|---|
| 9,733,645 B1 | 8/2017 | Andrasko et al. |
| 10,048,690 B1* | 8/2018 | Hilbert .................. B63H 25/42 |
| 10,372,976 B2 | 8/2019 | Kollmann et al. |
| 10,926,855 B2 | 2/2021 | Derginer et al. |
| 11,247,753 B2 | 2/2022 | Arbuckle et al. |
| 2013/0110329 A1* | 5/2013 | Kinoshita ............ G05D 1/0206 367/107 |
| 2015/0089434 A1* | 3/2015 | Akuzawa ............... B63H 25/02 715/773 |
| 2016/0264227 A1* | 9/2016 | Kinoshita ............. B63H 25/02 |
| 2017/0144740 A1* | 5/2017 | Ito .......................... B63H 25/02 |
| 2020/0407030 A1* | 12/2020 | Ueno ...................... B63B 79/10 |

* cited by examiner

*Primary Examiner* — Khoi H Tran
*Assistant Examiner* — Trang Dang
(74) *Attorney, Agent, or Firm* — Andrus Intellectual Property Law, LLP

(57) ABSTRACT

A method of controlling propulsion of a marine vessel includes receiving an instruction to engage a wake control mode and then automatically effectuating a steering change and/or a propulsion output change. A vessel orientation response to the steering change and/or the propulsion output change is measured and a determination of whether a wake zone requirement is met is made based on the orientation response. If the orientation requirement is met, a current propulsion output that meets the wake zone requirement is maintained. If the orientation requirement is not met, a further steering change and/or further propulsion output change is automatically effectuated until the wake zone requirement is met.

22 Claims, 7 Drawing Sheets

MARINE PROPULSION SYSTEM AND METHOD FOR WAKE CONTROL

FIELD

The present disclosure generally relates to methods and systems for propelling marine vessels, and more particularly to systems and methods for automatically controlling propulsion to comply with restrictions regarding generating wake.

BACKGROUND

Marine vessels traveling through bodies of water produce disturbances in the water surface downstream of the direction of travel, known as a wake. Certain sections of water are regulated to restrict wake generation by vessels, and such regulations are intended to help reduce wave production that could be a source of disturbance or danger for other boaters, local environments, swimmers, etc. A wake wave is different and potentially more hazardous than a regular wave because of its speed of travel, amplitude, and frequency of wave peaks. For this reason, it is important to adhere carefully to regulations related to wake in areas where those regulations are in effect. Many factors can impact wake production by a vessel, including hull size, vessel weight, direction of travel relative to naturally produced waves, current, wind, and more.

The following U.S. Patents and Applications provide background information and are incorporated herein by reference, in entirety.

U.S. Pat. No. 10,372,976 discloses an object detection system for a marine vessel having at least one marine drive and at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 9,733,645 discloses a system and method for controlling handling of a marine vessel having a steerable component that is steerable to a plurality of positions to vary a direction of movement of the vessel. A controller is communicatively connected to an actuator of the steerable component and a user input device provides to the controller an operator-initiated steering command to steer the steerable component to one of the plurality of positions. A sensor provides to the controller an indication of an undesired course change of the marine vessel. The controller has a vessel direction control section that outputs a command to the actuator to change a position of the steerable component from the one of the plurality of positions so as to automatically counteract the undesired course change. The vessel direction control section is active only when the operator-initiated steering command is less than or equal to a predetermined threshold.

U.S. Pat. No. 10,926,855 discloses a method for controlling low-speed propulsion of a marine vessel powered by a marine propulsion system having a plurality of propulsion devices that includes receiving a signal indicating a position of a manually operable input device movable to indicate desired vessel movement within three degrees of freedom and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

U.S. Pat. No. 11,247,753 discloses a method for maintaining a marine vessel at a global position and/or heading that includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel movements that will minimize the linear velocity difference and/or rotational velocity difference and carrying out the calculated movements.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a propulsion control system includes a propulsion device, a steering actuator configured to steer the propulsion device about a steering axis, and an orientation sensor configured to sense a heading at the marine vessel. A control system is configured to receive an instruction to engage in wake control mode and automatically control the steering actuator to effectuate a first steering change in a first direction. A heading change of the marine vessel sensed by the orientation sensor is monitored to detect whether a first threshold heading change occurs in response to the first steering change and then a determination of whether a minimum steerage speed requirement is met is made based on whether the first threshold heading change occurs. A propulsion output of the propulsion device is controlled so that the minimum steerage speed requirement is met.

In one embodiment, a method of controlling propulsion of a marine vessel includes receiving an instruction to engage a wake control mode and then automatically effectuating a steering change and/or a propulsion output change. A vessel orientation response to the steering change and/or the propulsion output change is measured and a determination of whether a wake zone requirement is met is made based on the orientation response. If the orientation requirement is met, a current propulsion output that meets the wake zone requirement is maintained. If the orientation requirement is not met, a further steering change and/or further propulsion output change is automatically effectuated until the wake zone requirement is met.

In one embodiment, the steering change is automatically effectuated by controlling a steering actuator to effectuate a first steering change of the propulsion device in a first direction and the wake zone requirement includes detecting a threshold heading change in response to the first steering change.

In another example, automatically effectuating the propulsion output change includes increasing or decreasing a speed parameter of propulsion and the wake zone requirement includes detecting that a pitch change in response to the speed parameter adjustment is less than a threshold pitch change.

In another embodiment, a propulsion control system includes a propulsion device, an orientation sensor configured to sense pitch of the marine vessel, and a control system. The control system is configured to receive an instruction to engage a wake control mode and automatically control the propulsion device to adjust a speed parameter of propulsion. The pitch of the marine vessel sensed by the orientation sensor is monitored to detect whether a threshold pitch change occurs in response to this speed parameter adjustment. A minimum wake speed is determined based on whether the threshold pitch change occurs and the propulsion device is controlled so that the minimum wake speed is not exceeded.

In another embodiment, a method of controlling propulsion of a marine vessel includes receiving an instruction to engage a wake control mode, automatically controlling a propulsion device on the marine vessel to adjust a speed parameter of propulsion, and detecting whether a threshold pitch change of the marine vessel occurs in response to the speed parameter adjustment. A minimum wake speed is determined based on whether the threshold pitch change occurs, and the propulsion device is controlled so that the minimum wake speed is not exceeded.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
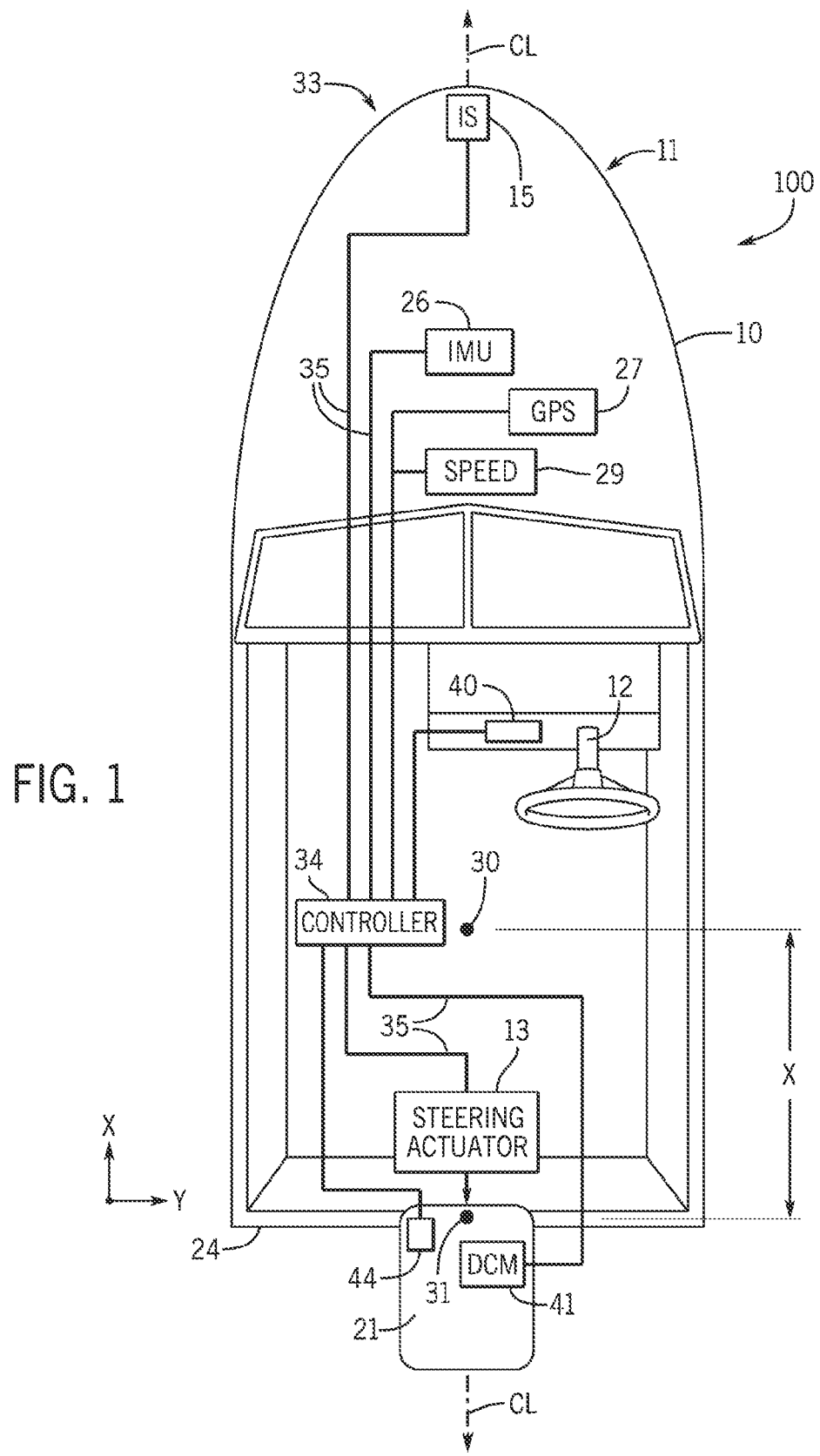
FIG. 1 is a schematic illustration of a marine vessel with one embodiment of a propulsion system according to the present disclosure.

The inventors have recognized a need for vessel control systems and methods that provide autonomous control that complies with wake restrictions. Wake restrictions vary in different areas due to varying standards from different regulating entities, due to different depths and sizes of waterways, varying ecologies, etc. For example, some areas are "minimum wake zones" that permit vessels to generate some minimal wake. Other areas are "no wake zones" where any wake generation is prohibited or highly discouraged. Some areas regulate based on vessel speed, others regulate based on the presence of wake, and still others regulate based on vessel position such as to prohibit bow rise. It can be difficult for boaters to become aware of local rules in every water area that they enter, and it may also be difficult for individuals to determine the bounds and types of wake restrictions in any given section of a water body. Moreover, even when boaters are aware of the wake restrictions in place for a particular water area, it can be difficult for boaters, particularly novices, to determine whether they are complying with those wake restrictions. For example, where regulations are based on wake generation, it can be difficult for a boater to determine whether they are generating wake and/or whether the generated wake exceeds the permitted "minimal" wake generation. Likewise, if can be difficult for novice boaters to detect when bow rise begins to occur, and thus they may inadvertently exceed local wake restrictions based on bow rise. Additionally, the inventors have recognized that autonomous vessel navigation systems are needed that can operate a vessel in compliance with wake restrictions.

The inventors have realized that there are generally two categories, or types of wake restricted areas, "no wake zones" where wake is generally prohibited and "minimum wake zones" where wake generation is limited. The inventors have recognized that, although restrictions vary across locales, certain minimum standards apply across each of the zone categories. The inventors have recognized that all, or nearly all, "no wake zones" permit vessels to travel at least at a minimum steerage speed, which is the minimum vessel speed at which steering responsiveness, and thus control over vessel heading, is maintained while still making headway. Minimum steerage speed will vary for different vessels based on the vessel weight and vessel dynamics and will also vary for a given vessel based on environmental conditions such as wind, waves, and current. The inventors have also recognized that all, or nearly all, "minimum wake zones" permit a vessel to travel at speeds that avoid bow rise. Bow rise occurs in most vessels as the vessel speed increases toward the planing speed. Once a vessel reaches its bow rise speed, the bow will begin to lift such that the vessel pitches upward. The speed at which bow rise occurs will depend on vessel configuration, weight of the vessel (e.g., whether it has a fill fuel tank or an empty one), weight distribution, and the like. Some vessel configurations do not experience bow rise, and for those vessels maximum speed limits may be used to limit wake in "minimum wake zones."

In view of the forgoing problems and challenges in the relevant field and in view of their recognition of the two generalizable categories of wake restrictions, the inventors have developed the disclosed systems and methods that automatically determine a vessel speed that complies with wake restrictions, such as "no wake zone" restrictions and/or "minimum wake zone" restrictions and operate the marine vessel's propulsion system accordingly. Propulsion output changes and/or steering changes are effectuated, which may be insubstantial changes that are not readily noticeable by an operator or passengers on a boat. The vessel orientation response is then monitored to determine whether the vessel is in compliance with applicable wake restrictions, such as whether the heading response meets minimum steerage requirements and/or whether the vessel pitch response complies with rules prohibiting bow rise.

In one embodiment, once a wake control mode is engaged, such as a no-wake control mode, a steering actuator is automatically controlled to effectuate a first steering change of the propulsion device in a first direction and a vessel orientation response is measured by monitoring a heading change of the marine vessel sensed by an orientation sensor. A control system is configured to determine whether a first threshold heading change has occurred in response to the first steering change and to determine whether a minimum steerage requirement is met based on whether the first threshold heading change occurs. A propulsion output of the propulsion device is then controlled so that the minimum steerage speed requirement is met.

For example, if the first threshold heading change has occurred in response to the steering change in the first direction, then in certain circumstances it may be determined that the minimum steerage requirement is met and the control system may maintain the current propulsion output. Alternatively or additionally, determining whether the minimum steerage requirement is met may require testing the steerage response in both the port and starboard directions, and thus determining whether a threshold heading change occurs in response to a steerage change in each of the first direction and a second direction opposite the first direction. Alternatively or additionally, the control system may be configured to detect an uninstructed heading change due to environmental conditions, such as wind and/or current and to test whether the minimum steerage speed requirement is met by effectuating a first steering change in the direction opposite of the uninstructed heading change. Thus, the system is configured to test for minimum steerage by steering the vessel in only one directions, the more difficult steering direction.

Alternatively or additionally, the system may be configured to, upon receiving an instruction to engage a wake control mode such as a "minimum wake control" mode, automatically control the at least one propulsion device on the marine vessel to adjust a speed parameter of forward propulsion and to monitor the vessel orientation response in the form of a pitch response. The control system may be configured to detect whether a threshold pitch change of the marine vessel occurs in response to the speed parameter adjustment. For example, the speed parameter adjustment may include adjusting at least one of a vessel speed, an RPM of the propulsion device, a throttle position of the propulsion device, a current delivered to the propulsion device, and/or a demand percent communicated to the propulsion device. The pitch of the vessel is monitored to detect whether a threshold pitch change occurs in response to the speed parameter adjustment. The minimum wake speed is then determined based on whether the threshold pitch change occurs. The propulsion device is controlled so that the minimum wake speed is not exceeded.

In one embodiment, the system may be configured to start the minimum wake speed determination by controlling the at least one propulsion device based on a predetermined initial speed parameter, such as a very low vessel speed or at a powerhead RPM slightly above idle RPM, for example. The system may then incrementally increase the speed parameter and monitor vessel pitch to determine the fastest speed that the vessel can be operated without detecting bow rise, or a threshold change in pitch associated with bow rise.

In another embodiment, the system may be configured to automatically execute a routine of increasing and decreasing the speed to locate the fastest speed at which the vessel can be operated without causing the threshold change in pitch. For example, the system may be configured to determine whether a current speed parameter, such as a current vessel speed or a current propulsion RPM is less than a threshold speed parameter, which may be a threshold set to identify that the vessel speed is well below a possible minimum wake speed, such as just above idle speed or forward progress less than one mile per hour. If the speed parameter is less than the threshold speed parameter, then the system may be configured to start by increasing speed parameter to test for the minimum wake speed. If the current speed parameter is instead greater than the threshold speed parameter, the system may be configured to start by decreasing the speed parameter to test for the minimum wake speed. In certain embodiments, the pitch of the marine vessel may be monitored over a period of time for each speed parameter increase to subtract out, or average out, the effects of waves or other periodic or temporary effects on vessel pitch so that the impact of the vessel speed change can be measured.

FIG. 1 is a schematic representation of a marine vessel 10 equipped with propulsion system 100 including at least one propulsion device 21 positioned at the stern 24, such as attached to the transom. The propulsion device 21 may be mounted at the stern 24 of the vessel along a centerline CL of vessel 10, which is to be understood as generally laterally centered with respect to the beam of the vessel 10 such that when the steerable rear propulsion device 21 is in a centered steering position it propels the marine vessel approximately or exactly straight ahead (under ideal conditions with no current, wind, or other lateral forces). In other embodiments, the propulsion system 100 may include multiple propulsion devices, such as mounted at the stern 24 and distributed equally about the centerline CL. The at least one propulsion device 21 may be, for example, an outboard drive, a stern drive, an inboard drive, a jet drive, or any other type of steerable drive. The at least one propulsion device 21 includes a powerhead configured to rotate a propulsor, such as propeller, to effectuate propulsion. In various embodiments, the powerhead may be an internal combustion engine or an electric motor.

The propulsion device 21 is steerable, having a steering actuator 13 configured to rotate the drive 21 about its vertical steering axis 31. The steering axis 31 is positioned at a distance X from the center of turn (COT) 30, which could also be the effective center of gravity (COG). The marine vessel 10 is maneuvered to adjust its heading by causing the at least one propulsion device 21 to rotate about its steering axis 31. The propulsion device 21 is rotated in response to an operator's manipulation of the steering wheel 12 or user input device 40, which is communicatively connected to the steering actuator 13 to rotate the propulsion device 21. Alternatively or additionally, the propulsion device 21 is rotated in response to an instruction from a navigation controller configured to autonomously steer the marine vessel 10. Rotating the rear propulsion device 21 and effectuating thrust thereby causes rotation of the marine vessel 10 about the effective COT 30.

The propulsion system 100 further includes a user input device 40, such as a joystick or a keypad, operable by a user to provide at least a lateral movement demand input and rotational movement demand input. The user input device enables a user to input a steering and/or propulsion command, such as a joystick configured to command surge, sway, and/or yaw command. The user input device may enable a user to give a rotational propulsion demand input commanding rotational movement of the marine vessel 10 about the COT 30 without lateral or surge movements, such as is common with a joystick. The system 100 may be configured to provide translational movement in other translational directions combining forward/reverse and port/starboard thrusts of the rear drive(s) 21. Alternatively, the propulsion system may be configured to only enable user input commands in the surge and yaw directions, and thus the user input device 40 may only include a throttle lever (in addition to the steering wheel 12), for example, and may not include a joystick.

The user steering and/or propulsion output command inputs provided at the user input device 40 are received by the control system 33, which may include multiple control devices communicatively connected via a communication link, such as a CAN bus (e.g., such as using a CAN Kingdom network protocol), to control the propulsion system 100 as described herein. Alternatively or additionally, a navigation controller, such as algorithm(s) for autonomous navigation control executed by the controller 34 or a separate control element configured for navigation (not shown), may provide steering and/or propulsion output command inputs to autonomously navigate the marine vessel to reach a destination and/or based on sensor inputs from one or more sensors, such as image sensor 15 or other sensor. For example, image sensor 15 may be equipped to sense and image the marine environment around the vessel by any means, which may be a visual light camera, radar, lidar, laser, etc. Each image sensor 15 has a field of view, which is the area captured, or imaged, by the respective image sensor 15. For example, the image sensor 15 may be configured to capture the horizon in the image, which may be used as a marker for tracking pitch changes of the vessel and features on the horizon may be utilized for tracking heading changes of the vessel.

In one example, the vessel may be equipped with at least two image sensors arranged as a stereovision system. Stereovision systems use a configuration of multiple cameras to capture image data and derive distances based on differences in pixel location. Utilizing this technology, stereovision systems can produce depth disparity maps that can identify the presence and/or characteristics of wave events such as wake traveling downstream from a marine vessel. Further technologies, such as computer vision learning systems and/or other stereo vision processing algorithms, can utilize stereovision image data to carry out functions such as identifying one or more horizon features and detecting one or more changes in vessel orientation, such as pitch and/or heading changes, based on changes in the image location of the horizon feature(s).

In the embodiment of FIG. 1, the control system 33 includes a central controller 34 communicatively connected to the drive control module (DCM) 41 of the rear propulsion device 21 and may also include other control devices such as a thrust vector module or other thrust and/or steering controller, a navigation controller, one or more image processing computers configured to process data from one or more imaging sensors 15, etc. The controller 34 can communicate instructions to the DCM 41 of the propulsion device 21 to effectuate a commanded magnitude of thrust and a commanded direction of thrust (forward or reverse), as is necessary to effectuate the commanded propulsion outputs. Further, the controller 34 can communicate instructions to the steering actuator 13 to rotate the propulsion device 21 about its steering axis 31, such as to effectuate steering changes as described herein. The controller also communicates a steering position command to the steering actuator 13 to steer the propulsion device 21. Drive position sensor 44 is configured to sense the steering angle, or steering position, of the drive 21, which may be utilized as feedback for steering control.

The user steering and/or output command inputs are received by the control system 33, which may include multiple control devices communicatively connected via a communication link 35, such as a CAN bus (e.g., a CAN Kingdom Network), to control the propulsion system 100 as described herein. It should be noted that the extent of connections and the communication links 35 may in fact be one or more shared connections, or links, among some or all of the components in the system. Moreover, the communication link 35 lines in FIG. 1 are meant only to demonstrate that the various control elements are capable of communicating with one another and do not represent actual wiring connections between the various elements, nor do they represent the only paths of communication between the elements. Additionally, the system 100 may incorporate various types of communication devices and systems, and thus the illustrated communication links 35 may represent various different types of wireless and/or wired data communication systems.

A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected. Any one of the controllers in the control system 33 may be configured to execute some of all of the instructions disclosed herein to test and assess whether wake zone requirements are met, and one or more of the controllers in the control system 33 may be communicatively connected and may be configured to cooperate to execute the methods and functions described herein.

The control system 33 may be configured to receive orientation measurements describing pitch, roll, and yaw positions of the vessel 10, as well as vessel speed values, from a navigation sensor system. For example, the navigation sensor system may include an inertial measurement unit (IMU) 26 or other sensor capable of measuring vessel orientation and/or the rate of change thereof. In another example, the navigation sensor may include an attitude and heading reference system (AHRS) that provides 3D orientation of the marine vessel 10 by integrating gyroscopic measurements, accelerometer data, and magnetometer data. A gyroscope, motion reference unit (MRU), tilt sensor, IMU, AHRS, or any combination of these devices could be used. In another example, separate sensors may be provided for sensing pitch, roll, and/or yaw of the marine vessel 10. Alternatively or additionally, the navigation sensor system may include a global positioning system (GPS) 27 or a global navigation satellite system (GNSS) located at a pre-selected fixed position on the vessel 10, which provides information related to the global position of the vessel 10, from which vessel speed may also be determined providing the vessel speed over ground (sometimes referred to as "pseudo vessel speed"). Alternatively or additionally, one or more vessel speed sensors 29 may be provided, such as a pitot tube or paddle wheel, to measure vessel speed over water. In other embodiments, the system 100 may include an inertial navigation system (INS). Signals from the GPS receiver 27 (or GNSS and/or INS) and/or vessel speed sensor 29 and the IMU 26 (or AHRS) are provided to the controller 34.

Figure 2:
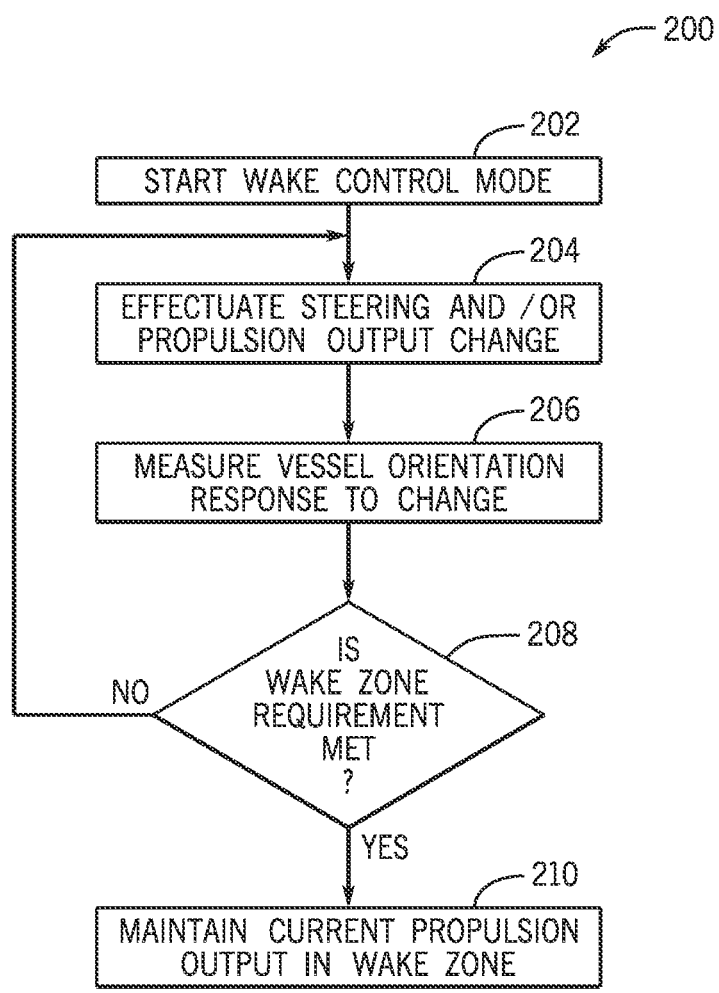
FIG. 2 is a flow chart illustrating an exemplary method of controlling propulsion of a marine vessel to meet a wake zone requirement according to one embodiment of the present disclosure.

FIG. 2 depicts one embodiment of a method 200 of automatically controlling propulsion of the marine vessel to determine whether a wake zone requirement is met and control propulsion of the marine vessel accordingly. A wake control mode is engaged at step 202, which may be automatically engaged based on sensed or determined restrictions at the marine vessel's current location or may be engaged in response to user input. For example, the system may be configured to automatically detect that the marine vessel is in a wake restriction zone based on a current GPS location of the marine vessel measured by the GPS system 27 compared to GPS-based map data and generate an instruction to engage the wake control mode. The map may be configured to identify the exitance of and/or type of wake zone restriction based on GPS location, such as to identify that a current GPS location is a "no wake zone" where stricter requirements are in place prohibiting wake generation or a "minimum wake zone" allowing a small amount of wake generation but prohibiting the generation of substantial wake waves. Alternatively, the control system 33 may be configured to utilize other GPS techniques for identifying wake restricted zones, such as geo-fencing to establish a "fenced-in" area associated with certain types of wake restrictions according to measured GPS coordinates, and to generate an instruction to engage the wake control mode based on GPS location.

Alternatively, the control system 33 may be configured to automatically detect that the marine vessel is in a restricted wake zone based on input from image sensors 15 on the vessel configured to capture visual light images of the surrounding environment and to detect wake zone signs within image data from the image sensor 15. For example, the system may be configured to detect warning buoys or other "no wake" signs or visual indicators of wake restrictions, such as utilizing computer vision machine learning (CVML) or other image processing techniques for pattern recognition. The system may be configured to identify a type of wake restricted zone, such as a no wake zone or a minimum wake zone, based on the identified signs, and to engage the appropriate wake control mode based thereon.

Alternatively or additionally, the control system 33 may be configured such that a user can engage one or more wake control modes, such as via a user input device at the helm of the marine vessel, such as a button on a touch screen of a display device at the helm or on a portable computing device communicatively connected with the control system 33.

Once the wake control mode is engaged, whether automatically by the control system 33 or by the user, steering and/or propulsion output changes are automatically effectuated by the control system 33 at step 204. The steering and/or propulsion output changes are configured to test whether the wake zone requirement is met. A vessel orientation response to the steering and/or propulsion change is measured at step 206. For example, the orientation response may be a heading change resulting from the steering change effectuated at step 204. Alternatively or additionally, the orientation response may be a change in vessel pitch responsive to a propulsion output change automatically effectuated by the control system 33.

Instructions are then executed at step 208 to determine whether a wake zone requirement is met. For example, the control system 33 may be configured to compare the vessel orientation response to a threshold orientation change and to determine whether the current vessel speed is appropriate and meets the wake zone requirement(s) based on the comparison. If the wake zone requirement(s) are not met, further steering and/or propulsion output changes may be effectuated until the wake zone requirement is confirmed to be met. Once the requirement is met, then the appropriate vessel speed has been identified and propulsion output can be controlled accordingly at step 210 to maintain the appropriate vessel speed in the wake zone.

Figure 3:
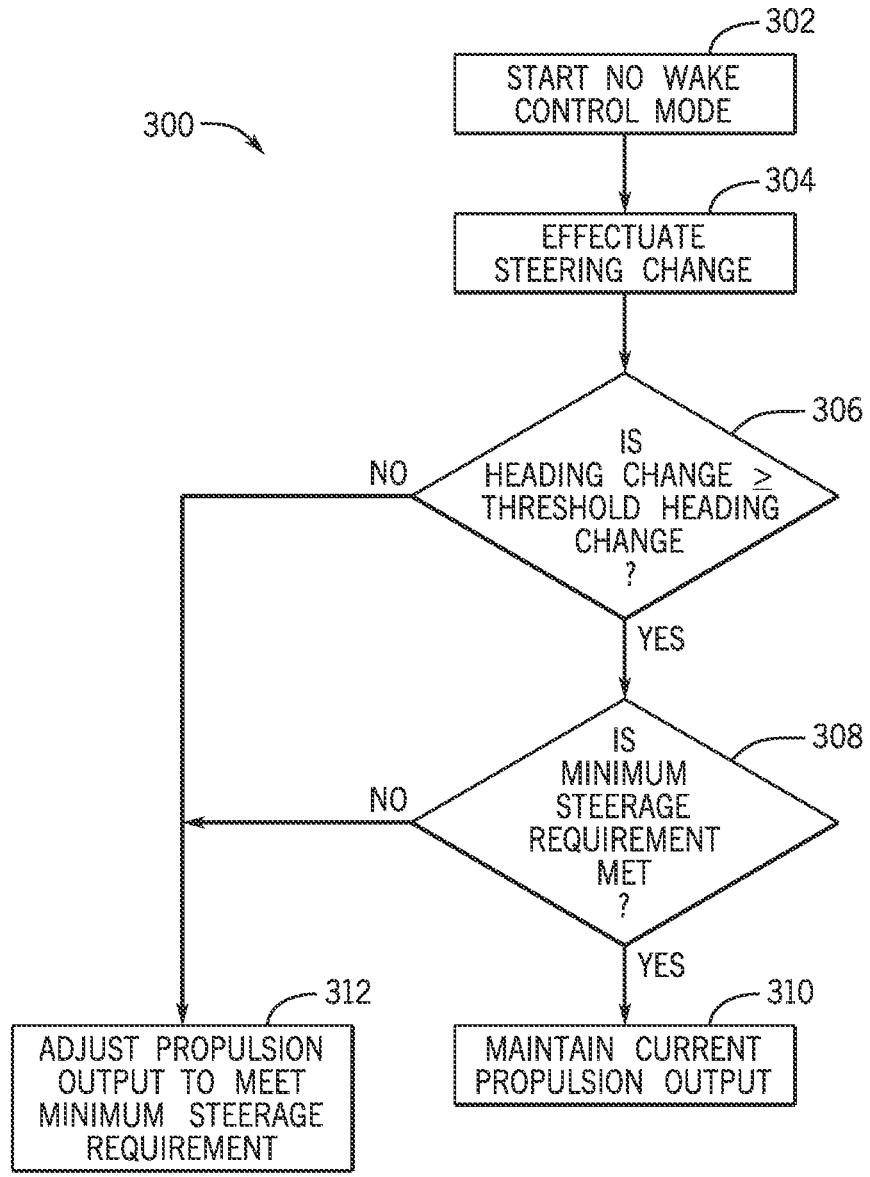
FIGS. 3-5 are flow charts illustrating exemplary methods of controlling propulsion of a marine vessel to meet a minimum steerage requirement according to embodiments of the present disclosure.

FIG. 3 depicts one embodiment of a method 300 that may be executed by the propulsion control system 33 when a no wake control mode is engaged whereby the minimum steerage speed is determined and the vessel is controlled accordingly so that the vessel does not generate a wake or does not violate the "no wake zone" regulations. Upon engagement of the no wake control mode at step 302, which may be engaged automatically by the control system 33 or based on user input as described above, a steering change is effectuated at step 304. For example, the steering change may be effectuated by controlling the steering actuator to change the steering position of the marine vessel at a predetermined change rate for a predetermined time. The steering change may be temporary, and thus the system may control the steering actuator to return the propulsion device to the steering position before effectuating the steering change, and thus to only temporarily effectuate the steering change for the sole purpose of testing the minimum steerage requirement.

Alternatively, the steering change may be effectuated as part of a heading maintenance action and/or to counteract an uninstructed heading change caused by environmental forces, such as wind, waves, or current. Thus, the steering change may be maintained even after the orientation response is measured and the minimum steerage requirement is determined to be met. Vessel orientation is monitored in response to the automatically effectuated steering change, and instructions are executed at step 306 to determine whether the heading change is greater than or equal to a threshold heading change. For example, the threshold heading change may be a threshold minimum heading change representing a minimum amount of responsive heading change indicating that the vessel is steerable in the direction of the steering change at the current vessel speed parameter. To provide just one illustrative example, where a steering change of five degrees is effectuated at step 304 to steer the vessel in the starboard direction, instructions may be executed to determine whether the vessel heading turns in the starboard direction by at least a threshold amount, such as to determine whether the heading has changed at least five degrees in the starboard direction.

Step 308 is then conducted to assess whether the minimum steerage requirement is met based on the threshold heading change. For example, if the heading change is less than the threshold heading change, then the minimum steering requirement will not be met. In some embodiments, additional logic may be executed in conjunction with the heading assessment to determine whether the minimum steering requirement is met, such as testing heading response in both heading directions and/or verification that a threshold forward progress is made. Further propulsion adjustments will then be executed at step 312 and the heading response will be assessed until the minimum steerage requirement is met.

Additionally, the system may be configured to assess a maximum heading threshold and the minimum steerage requirement may further be conditioned on whether the heading change is less than or equal to the maximum threshold heading change. Where the maximum threshold heading changes is exceeded, the propulsion output may be decreased. Once the minimum steerage requirement is met, then the propulsion output is maintained at step 310 to control propulsion in compliance with the wake zone restrictions.

Figure 4:
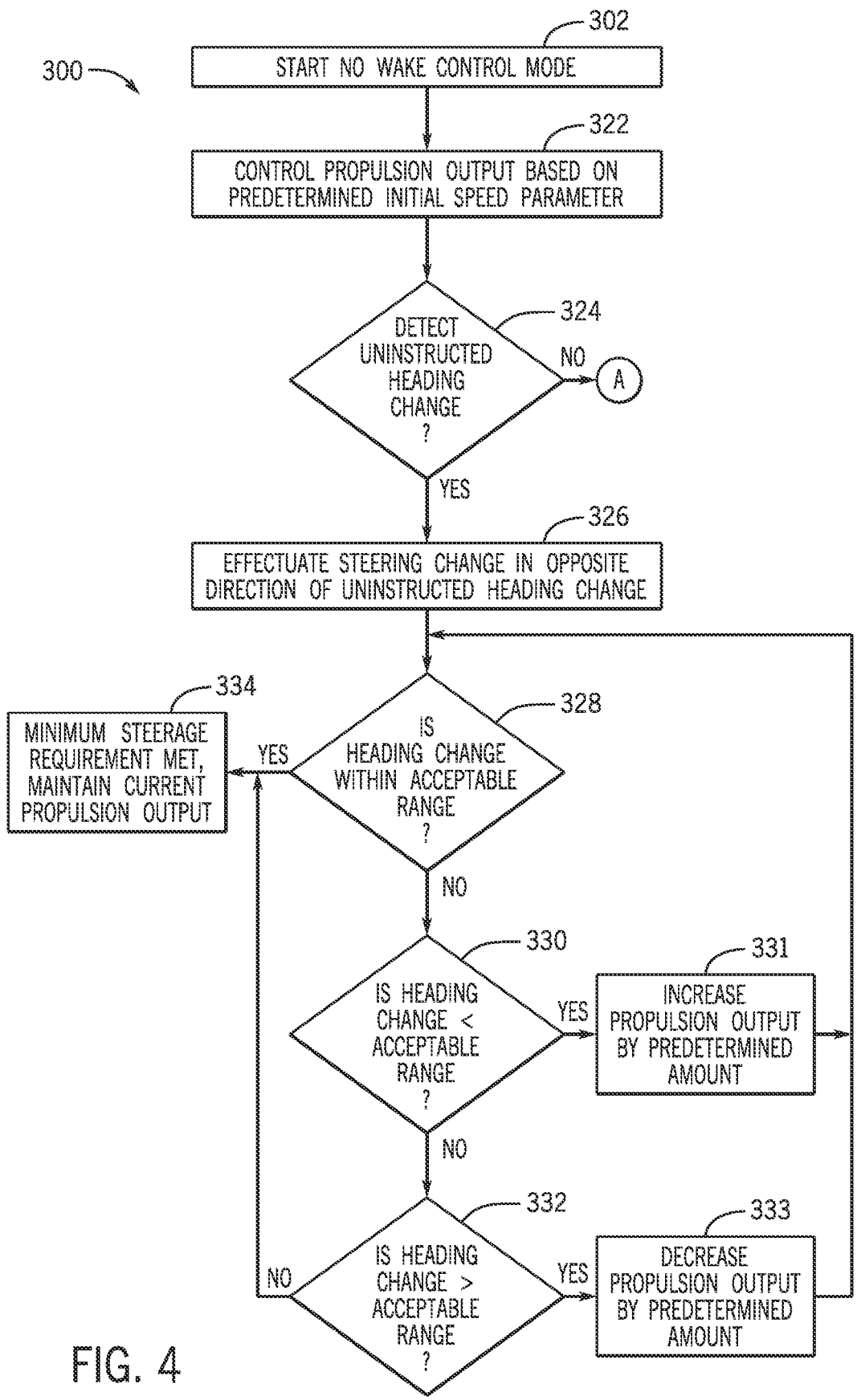

FIG. 4 depicts another example of a method 300 of controlling propulsion to assess a minimum steerage requirement and control the vessel accordingly in a "no wake zone." Once the no wake control mode is engaged at step 302, as described above, propulsion output is controlled based on a predetermined initial speed parameter at step 322. In one embodiment, the predetermined initial speed parameter may be a value previously identified by the control system 33 as meeting the minimum steerage requirement, such as a last-determined minimum steerage speed value. Alternatively, the initial speed parameter may be a consistent predetermined value utilized as a starting point for every minimum steerage speed determination.

The predetermined initial speed parameter may be one of a vessel speed, an RPM of the propulsion device 21, a throttle position of the propulsion device 21, a current of the propulsion device 21, or a demand percent representing the command to the propulsion device 21. The RPM of the propulsion device may be a rotational speed of the powerhead, such as an internal combustion engine or electric motor driving rotation of the propeller. Alternatively, the RPM of the propulsion device 21 may be a propeller speed or some other rotational speed effectuated in the propulsion device 21 and measurable or ascertainable based on sensed parameters. The throttle position of the propulsion device 21 may be, for example, the position of a throttle valve controlling air intake to internal combustion engine powerhead. Where the propulsion device 21 includes an electric motor powerhead, the speed parameter may be a current delivered to and consumed by the electric motor powerhead and/or a torque output of the electric motor.

The heading of the marine vessel is monitored, such as based on input from the IMU 26. If an uninstructed heading change is detected at step 324, then that information can be utilized to determine which heading direction will require a greater vessel speed to maintain steering control and utilize that information to test only one steering direction to obtain the minimum steerage speed. The steering change is effectuated at step 326 in the opposite direction of the uninstructed heading change. Thus, for example, if the one or more propulsion devices 21 are in the centered position at the start of the minimum steerage speed determination that the bow is turning five degrees in the port direction over a predetermined period of a few seconds, such as due to wind and waves, then the control system 33 may effectuate a steering change in the starboard direction to correct the unintended heading change resulting from environmental impact.

The minimum steerage determination is conducted based on the heading change response to the steering change. The heading change is monitored, such as based on output from the IMU 26 or other vessel orientation sensor, and instructions are executed at step 328 to determine whether the heading change is within an acceptable range. The upper and lower limits of the acceptable range of heading change may be defined based on the magnitude of the steering change effectuated at step 326. The acceptable range may define a minimum heading change limit that indicates a minimum detectable vessel turn that is attributable to the steering change and a maximum heading change that indicates a maximum allowable response to the steering change. The upper limit of the acceptable range of heading change may be established to identify when the marine vessel is traveling too fast, and thus may be at risk of violating the wake restriction in the no wake zone.

If the heading change is within the acceptable range at step 328, then the minimum steerage requirement is determined to be met and the current propulsion output can be maintained at step 334. If the heading change is less than the acceptable range at step 330, then propulsion output is increased at step 331, such as by a predetermined amount. The heading change response to the propulsion output increase is then reassessed to determine whether the minimum steerage requirement is met. If the heading change is above the acceptable range at step 332, then the propulsion output is decreased at step 333, such as by a predetermined amount, and the heading change response is then assessed as described above.

Figure 5:
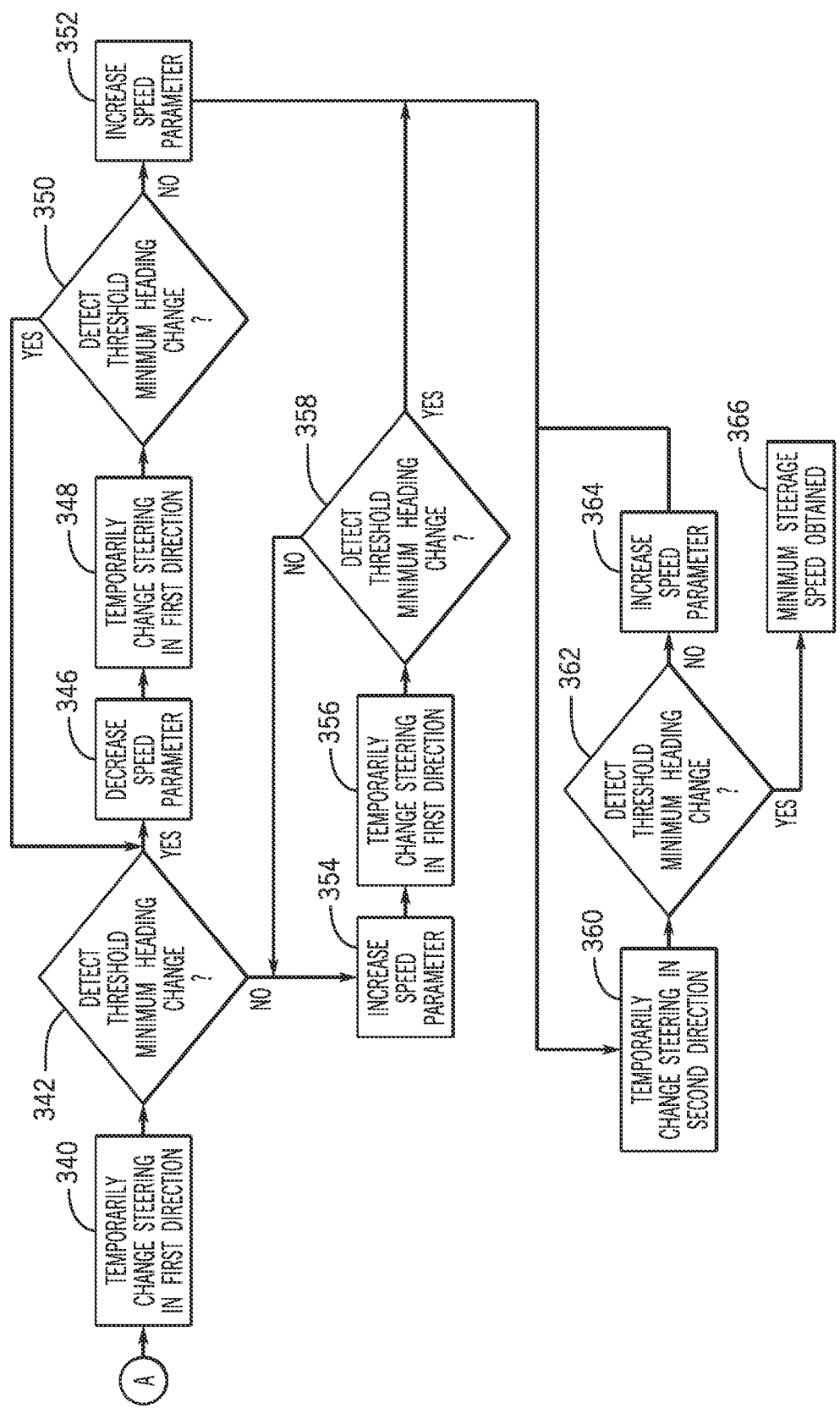

If an uninstructed heading change is not detected at step 324, then steps may be executed to temporarily effectuate a steering change to test for minimum steerage. Alternatively, temporary steerage changes may be effectuated in both directions regardless of uninstructed heading changes. FIG. 5 another example of a method 300 of controlling propulsion to assess a minimum steerage requirement by effectuating temporary steering changes. A temporary steering change is effectuated in a first direction at step 340. For example, a steering change of a predetermined magnitude may be effectuated in either the starboard or port direction and may be held for a predetermined time. Step 342 is executed to monitor the vessel heading and determine whether a threshold minimum heading change is detected. For example, the threshold minimum heading change may be a minimum expected heading change corresponding in direction with the steering change.

If the minimum heading change is detected in response to the temporary steering change, then steps may be executed to determine whether the speed parameter can be decreased while still maintaining a heading response. The speed parameter is decreased at step 346, which as described above may be any of various parameters associated with vessel speed and/or propulsion output, including measured or pseudo vessel speed, RPM of the propulsion device, current delivery, throttle position, etc. The temporary steering change in the first direction is performed again at step 348 and instructions are executed at step 350 to monitor the vessel heading and detect whether the threshold minimum heading change has occurred. If the minimum heading change response is still detected, then the speed parameter is decreased again until the threshold minimum heading change is no longer detected. Thereby, the control system 33 identifies a vessel speed at which steering control is no longer available. The speed parameter is then increased at step 352 such that steering control is regained. For example, the speed parameter may be increased to the last speed parameter which the threshold minimum heading change was detected, or to some other speed parameter value above that where the threshold minimum heading change was no longer detected.

Returning to step 342, if the threshold minimum heading change is not detected, then the speed parameter is increased at step 354, such as by a predetermined amount. A temporary steering change is effectuated again in the first direction at step 356. Instructions are executed at step 358 to monitor the vessel heading and detect whether the threshold minimum heading change has occurred. If it has not, then the speed parameter is again increased until the threshold minimum heading change is detected.

Once the minimum steerage speed for the first heading direction is identified, steps are executed to test the opposite steering direction to make sure that steering control is maintained in both directions. The steering is changed in the second direction at step 360, which is a temporary steering change in the opposite direction than the first direction.

Thus, if a steering change was made to turn the vessel in the port direction at step 340, then the propulsion device(s) 21 will be steered in the opposite direction intending to turn the bow in the starboard direction. Instructions are executed at step 362 to monitor the vessel heading and detect whether a threshold minimum heading change has occurred in the expected direction. If not, then the vessel speed is increased at step 364 until the threshold minimum heading change is detected. Once the threshold minimum heading change is detected in the second direction, then the minimum steerage speed is obtained at step 366.

The one or more propulsion devices 21 can then be controlled based on the minimum steerage speed value. In certain examples, the routine for determining the minimum steerage speed may be re-executed at predetermined time intervals to verify that minimum steerage control is maintained. Alternatively or additionally, the routine for determining minimum steerage speed may be re-executed if an uninstructed heading change is detected.

Figure 6:
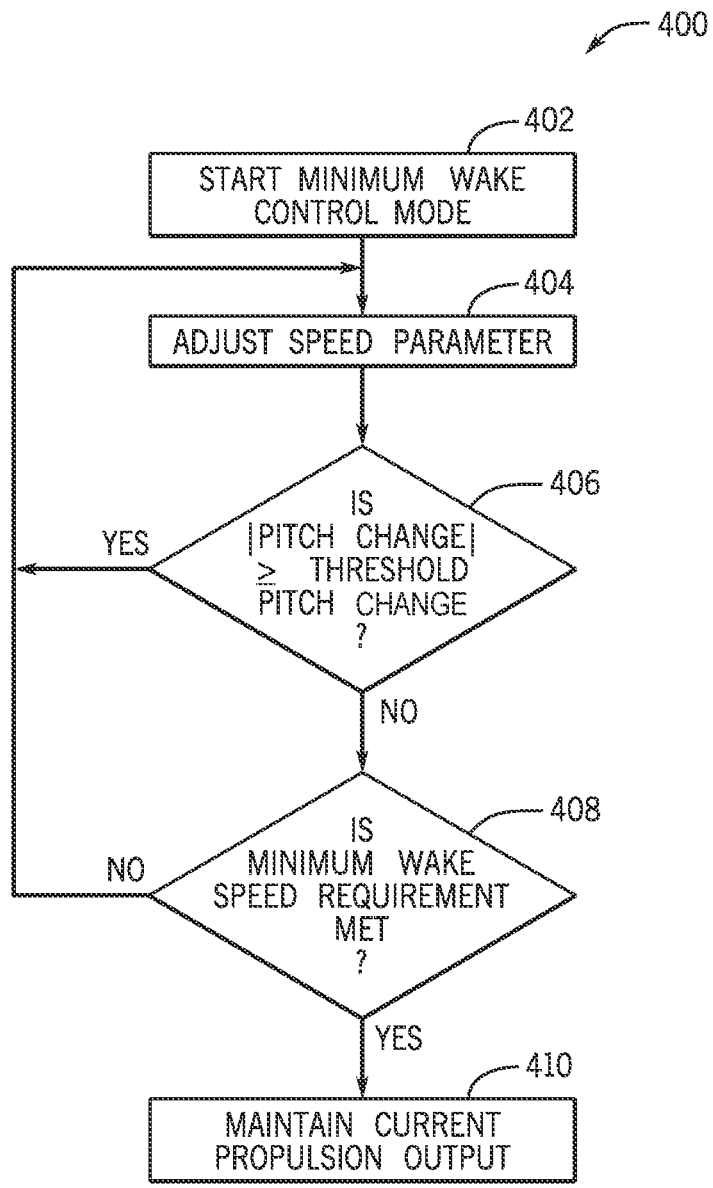
FIGS. 6-7 are flow charts illustrating exemplary methods of controlling propulsion of a marine vessel so that a minimum wake speed is not exceeded according to embodiments of the present disclosure.
Figure 7:
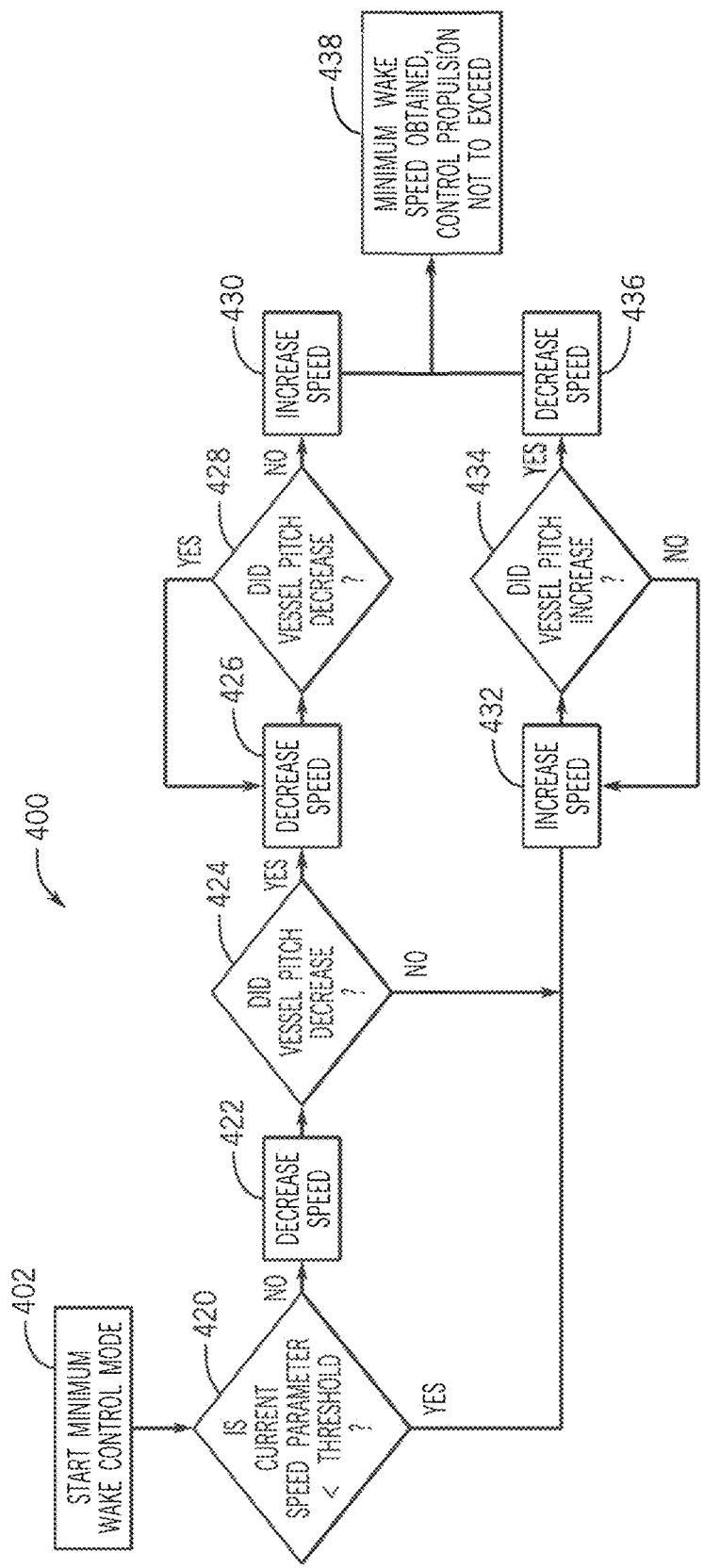

FIGS. 6 and 7 illustrate embodiments of a method 400 of controlling propulsion so that a minimum wake speed is not exceeded. Namely, the vessel orientation response is measured as a pitch change in response to a propulsion output change, and thus to measure the change in bow rise resulting from a change in propulsion output. In FIG. 6, a minimum wake control mode is initiated at step 402, which may be in response to a user input or may be automatically engaged by the control system 33 upon detection of a minimum wake zone based on GPS location or by detection of minimum wake zone signs via one or more image sensors 15. A speed parameter of propulsion is adjusted at step 404, such as a vessel speed, an RPM of the propulsion device, a throttle position of the propulsion device, current delivered to the propulsion device, and/or a demand percent commanded to the propulsion device 21. A speed parameter adjustment may increase or decrease the vessel pitch, such as based on starting value of the speed parameter and/or based on a comparison to historic wake speed determinations. However, the speed parameter may be capped such that the assessed speeds are below planing speed, as the vessel is not permitted to be on plane in a minimum wake zone. For example, if the current speed parameter prior to the adjustment is less than the speed parameter last identified as meeting the minimum wake speed requirement, then the speed parameter may be increased at step 404. Conversely, if the current speed parameter is greater than a last identified speed parameter that meets the minimum wake speed requirement, then the speed parameter may be decreased at step 404.

Step 406 is executed to determine whether the magnitude of the pitch change is less than or equal to a threshold pitch change. Additionally, the control system 33 may be configured to assess the direction of the pitch change to make sure that it is directionally consistent with the adjustment to the speed parameter. Namely, provided that the vessel remains below its planing speed, an increase in the speed parameter is expected to increase the vessel's pitch (if it has any effect) because, for most vessels, increasing the vessel speed increases bow rise up until the planing speed is reached. Similarly, if the vessel speed is decreased, then the control system may look for a decrease in vessel pitch. If the threshold pitch change is detected, then the speed parameter is further adjusted until the speed parameter adjustment does not materially impact vessel pitch.

In certain examples, the control system 33 may be configured to determine an average vessel pitch over time to determine whether the threshold vessel pitch change has occurred, which thereby enables periodic or momentary effects on vessel pitch from environmental factors, such as wind or waves, and/or due to passenger or other activity on the marine vessel imparting a momentary force on the vessel which causes a temporary pitch change.

Step 408 is executed to determine whether the minimum wake speed requirement is met. For example, whether the current vessel parameter is the largest speed parameter that does not effectuate the threshold change in pitch, and thus does not cause discernable bow rise. If the minimum wake speed requirement is not met, then the speed parameter is further adjusted until the minimum wake speed requirement is met. Thereafter, the one or more propulsion devices 21 are controlled at step 410 so that the minimum wake speed is not exceeded.

FIG. 7 depicts another embodiment of a method 400 of controlling propulsion of the marine vessel to identify the minimum wake speed and utilize it to cap propulsion output. The minimum wake control mode is initiated at step 402, as described above. Step 420 is then executed to determine whether the current speed parameter is less than a threshold speed parameter. For example, the threshold speed parameter may represent a relatively low speed value that is well below expected minimum wake speed under all conditions. For example, the threshold speed parameter may be a vessel speed of one or two miles per hour or a powerhead RPM that is only slightly greater than an idle RPM value.

If the speed parameter is less than the threshold speed parameter, then the control system 33 automatically skips the steps related to decreasing the speed parameter and immediately proceeds to step 432 where the speed parameter of propulsion is increased. For example, the speed parameter increase may be a predetermined vessel speed increase, such as an increase of 0.5 miles per hour. Alternatively, the speed parameter increase may be a predetermined increase in the RPM of the powerhead, such as an increase of 50 RPM. Step 434 is then executed to determine whether the vessel pitch increases in response to the increase in the speed parameter of propulsion. If not, then the speed parameter is increased further until a threshold vessel pitch increase is detected. The control system 33 then decreases the vessel speed at step 436, such as to the last identified speed parameter for which the vessel pitch increase was not detected. The minimum wake speed—the vessel speed parameter at which the minimum wake speed requirement(s) are met—is thus obtained and the propulsion device(s) 21 are controlled accordingly at step 438.

Returning to step 420, if the current speed parameter is greater than or equal to the threshold, then the control system continues to step 422 where the speed parameter of propulsion is decreased. The vessel speed decrease may be, for example, a predetermined decrease in vessel speed or a predetermined decrease in powerhead RPM. Instructions are executed at step 424 to monitor vessel pitch and determine whether the vessel pitch decreased by a threshold amount. If the vessel pitch decreases in response to the decrease in vessel speed, then the speed parameter of propulsion is further decreased at step 426 and the vessel pitch response is analyzed at step 428 to determine whether the vessel's pitch continues to decrease in response. The speed parameter of propulsion is slowly decreased until no vessel pitch response is detected at step 428. Once that occurs, then the speed parameter can be increased again at step 430 to the previous speed parameter value prior to the threshold pitch decrease not being detected. The minimum wake speed is thus obtained and the propulsion device(s) 21 are controlled accordingly at step 438.

If the vessel pitch did not decrease at step 434 in response to the initial speed decrease, then it can be assumed that the starting speed parameter was below the minimum wake speed and the speed parameter of propulsion can be increased at step 432 and the pitch response can be monitored as the speed parameter is progressively increased until a threshold pitch increase is detected. The speed parameter is then decreased at step 436, as described above, in order to reduce propulsion back to the minimum wake speed, and the one or more propulsion devices 21 may be controlled such that the minimum wake speed is not exceeded.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A propulsion control system for a marine vessel comprising:
   a propulsion device;
   a steering actuator configured to steer the propulsion device about a steering axis;
   an orientation sensor configured to sense a heading of the marine vessel;
   one or more controllers configured to:
      receive an instruction to engage a wake control mode;
      automatically control the steering actuator to effectuate a first steering change in a first direction;
      monitor a heading change of the marine vessel sensed by the orientation sensor and detect whether a first threshold heading change occurs in response to the first steering change;
      determine whether a minimum steerage speed requirement is met based on whether the first threshold heading change occurs; and
      control a propulsion output of the propulsion device so that the minimum steerage speed requirement is met.

2. The system of claim 1, wherein the propulsion device is in a first steered position prior to effectuating the first steering change and wherein the one or more controllers are further configured to:
   automatically control the steering actuator to return the propulsion device to the first steered position;
   automatically control the steering actuator to effectuate a second steering change in a second direction opposite the first direction;
   monitor the heading change of the marine vessel measured by the orientation sensor and detect whether a second threshold heading change occurs in response to the second steering change;
   automatically control the steering actuator to return the propulsion device to the first steered position; and
   determine whether the minimum steerage speed requirement is met based further on whether the second threshold heading change occurs.

3. The system of claim 2, wherein the one or more controllers are configured to effectuate the first steering change as a first change rate in the first direction for a predetermined time and to effectuate the second steering change as a second change rate in the second direction for the predetermined time, wherein the first threshold heading change is based on the first change rate in the first direction and the second threshold heading change is based on the second change rate in the second direction.

4. The system of claim 1, wherein the one or more controllers are configured to effectuate the first steering change as a first change rate in the first direction for a predetermined time, and wherein the first threshold heading change is a threshold rate of heading change based on the first change rate.

5. The system of claim 1, wherein determining whether the minimum steerage speed requirement is met incudes determining that the heading change is within an acceptable range of heading change;
   wherein the one or more controllers are further configured to:
      if the heading change is greater than the acceptable range of heading change, control the propulsion output of the propulsion device to decrease a speed of the marine vessel until the minimum steerage speed requirement is met; and
      if the heading change is less than the acceptable range of heading change, control the propulsion output of the propulsion device to increase the speed of the marine vessel until the minimum steerage speed requirement is met.

6. The system of claim 1, wherein detecting whether the first threshold heading change occurs includes determining whether the heading change is greater than a minimum threshold heading change;
   wherein the one or more controllers are further configured to:
      if the heading change is greater than the minimum threshold heading change, control the propulsion output of the propulsion device to decrease a speed of the marine vessel until the heading change is less than or equal to the minimum threshold heading change; and
      if the heading change is less than the minimum threshold heading change, control the propulsion output of the propulsion device to increase the speed of the marine vessel until the heading change is greater than or equal to the minimum threshold heading change.

7. The system of claim 1, wherein the one or more controllers are further configured to, following receipt of the instruction to engage the wake control mode, control the propulsion device based on a predetermined initial speed parameter, and wherein controlling the propulsion output of the propulsion device such that the minimum steerage speed requirement is met includes modifying a current speed parameter to be greater or less than the predetermined initial speed parameter until the minimum steerage speed requirement is met.

8. The system of claim 1, wherein the one or more controllers are further configured to, while the wake control mode is engaged, periodically control steering to determine whether the minimum steerage speed requirement is met based on whether the first threshold heading change occurs and control the propulsion output of the propulsion device such that the minimum steerage speed requirement is met.

9. The system of claim 1, wherein the orientation sensor includes at least one of an inertial measurement unit (IMU), a global navigation satellite system (GNSS), an inertial navigation system (INS), or a camera configured to image a horizon.

10. The system of claim 1, wherein the one or more controllers are further configured to:
   automatically control the propulsion output of the propulsion device to adjust a speed parameter of the marine vessel;
   monitor a pitch of the marine vessel sensed by the orientation sensor and detect whether a first threshold pitch change occurs in response to the speed parameter adjustment;
   determine a minimum wake speed based on whether the threshold pitch change occurs; and
   control the propulsion output of the propulsion device so that the minimum wake speed is not exceeded.

11. A method of controlling propulsion of a marine vessel, the method comprising:
   receiving an instruction to engage a wake control mode;
   automatically effectuating a steering change;
   measuring a vessel orientation response to the steering change;
   determining whether a wake zone requirement is met based on the vessel orientation response, including whether a threshold heading change occurs in response to the steering change;
   when the wake zone requirement is met, controlling at least one propulsion device to maintain a current propulsion output that meets the wake zone requirement; and
   when the wake zone requirement is not met, controlling at least one propulsion device to automatically effectuate further steering change until the wake zone requirement is met.

12. The method of claim 11, wherein automatically effectuating the steering change includes automatically controlling a steering actuator to effectuate a first steering change in a first direction and wherein the wake zone requirement includes a minimum steerage requirement, and further comprising:
   monitoring a heading change of the marine vessel sensed by an orientation sensor and detecting whether a first threshold heading change occurs in response to the first steering change;
   determining whether the minimum steerage speed requirement is met based on whether the first threshold heading change occurs; and
   controlling the propulsion output of the propulsion device so that the minimum steerage speed requirement is met.

13. The method of claim 12, wherein, if the minimum steerage speed requirement is not met, the propulsion output of the propulsion device is changed by a predetermined amount.

14. The method of claim 12, wherein the propulsion device is in a first steered position prior to effectuating the first steering change and further comprising:
   automatically controlling the steering actuator to return the propulsion device to the first steered position;
   automatically controlling the steering actuator to effectuate a second steering change of the propulsion device in a second direction opposite the first direction;
   monitoring the heading change of the marine vessel measured by the orientation sensor and detecting whether a second threshold heading change occurs in response to the second steering change;
   automatically controlling the steering actuator to return the propulsion device to the first steered position; and determining whether the minimum steerage speed requirement is met based further on whether the second threshold heading change occurs.

15. The method of claim 12, wherein the first threshold heading change is a threshold rate of heading change.

16. The method of claim 15, wherein the first steering change is a first change rate in the first direction for a predetermined time, and wherein the threshold rate of heading change is based on the first change rate.

17. The method of claim 12, wherein determining that the minimum steerage speed requirement is met includes determining that the heading change is within an acceptable range of heading change.

18. The method of claim 17, wherein the method further includes:
   if the heading change is greater than the acceptable range of heading change, controlling the propulsion output of the propulsion device to decrease a speed of the marine vessel until the minimum steerage speed requirement is met; and
   if the heading change is less than the acceptable range of heading change, controlling the propulsion output of the propulsion device to increase the speed of the marine vessel until the minimum steerage speed requirement is met.

19. The method of claim 12, wherein detecting whether the first threshold heading change occurs includes determining whether the heading change is greater than a minimum threshold heading change;
   wherein the method further includes:
      if the heading change is greater than the minimum threshold heading change,
      controlling the propulsion output of the propulsion device to decrease a speed of the marine vessel until the heading change is less than or equal to the minimum threshold heading change; and
      if the heading change is less than the minimum threshold heading change, controlling the propulsion output of the propulsion device to increase the speed of the marine vessel until the heading change is greater than or equal to the minimum threshold heading change.

20. The method of claim 12, further comprising following receipt of the instruction to engage the wake control mode, control the propulsion device based on a predetermined initial speed parameter, and wherein controlling the propulsion output of the propulsion device such that the minimum steerage speed requirement is met includes modifying a current speed parameter to be greater or less than the predetermined initial speed parameter until the minimum steerage speed requirement is met.

21. The method of claim 20, wherein the predetermined initial speed parameter is one of a vessel speed, a revolutions per minute (RPM) of the propulsion device, a throttle position of the propulsion device, a current of the propulsion device, and a demand percent previously identified as meeting the minimum steerage speed requirement.

22. The method of claim 11, further comprising automatically effectuating a propulsion output change that includes automatically controlling the propulsion device to adjust a speed parameter of propulsion and wherein the vessel orientation response includes a pitch change and the wake zone requirement includes a minimum wake speed, and further comprising:
   detecting whether a threshold pitch change of the marine vessel occurs in response to the speed parameter adjustment;

determining the minimum wake speed based on whether the threshold pitch change occurs; and controlling the propulsion device so that the minimum wake speed is not exceeded.

* * * * *